United States Patent [19]

Schelkmann

[11] 4,093,481
[45] June 6, 1978

[54] METHOD FOR RETREADING AND REPAIRING VEHICLE TIRES

[75] Inventor: Wilhelm Schelkmann, Witten, Germany

[73] Assignee: Vakuum Vulk Holdings Limited, Nassau, Bahamas

[21] Appl. No.: 653,240

[22] Filed: Jan. 28, 1976

[30] Foreign Application Priority Data

Jan. 31, 1975 Germany .............................. 2503973

[51] Int. Cl.² ............................................ B29H 17/36
[52] U.S. Cl. ...................................... 156/95; 156/96; 156/286
[58] Field of Search ............................. 156/87, 94–98, 156/104, 110, 123, 126–129, 285, 286, 394

[56] References Cited

U.S. PATENT DOCUMENTS

| | | | |
|---|---|---|---|
| 2,429,121 | 10/1947 | Crowley | 156/87 |
| 2,429,123 | 10/1947 | Crowley | 156/286 |
| 2,966,936 | 1/1961 | Schelkmann | 156/96 |
| 3,149,658 | 9/1964 | Wolfe | 156/95 |
| 3,558,383 | 1/1971 | Lejeune | 156/94 |
| 3,753,821 | 8/1973 | Ragen | 156/96 |
| 3,815,651 | 6/1974 | Neal | 156/96 |
| 3,904,459 | 9/1975 | Schelkmann | 156/96 |
| 3,925,129 | 12/1975 | Blankenship | 156/96 |

FOREIGN PATENT DOCUMENTS

| | | | |
|---|---|---|---|
| 555,690 | 9/1943 | United Kingdom | 156/96 |
| 746,375 | 10/1953 | United Kingdom | 156/96 |
| 1,277,642 | 6/1972 | United Kingdom | 156/96 |

*Primary Examiner*—David Klein
*Assistant Examiner*—John E. Kittle
*Attorney, Agent, or Firm*—Schuyler, Birch, Swindler, McKie & Beckett

[57] ABSTRACT

A method for repairing or retreading a vehicle tire comprising the steps of filling a repair region with vulcanisable rubber, covering the repair region with a flexible cover attached around its edges to the tire with an adhesive, piercing the cover with a suction needle at points where air or other gases have accumulated, sealing of the openings made by the needle, and heating the repair region to vulcanize the repair rubber.

10 Claims, 4 Drawing Figures

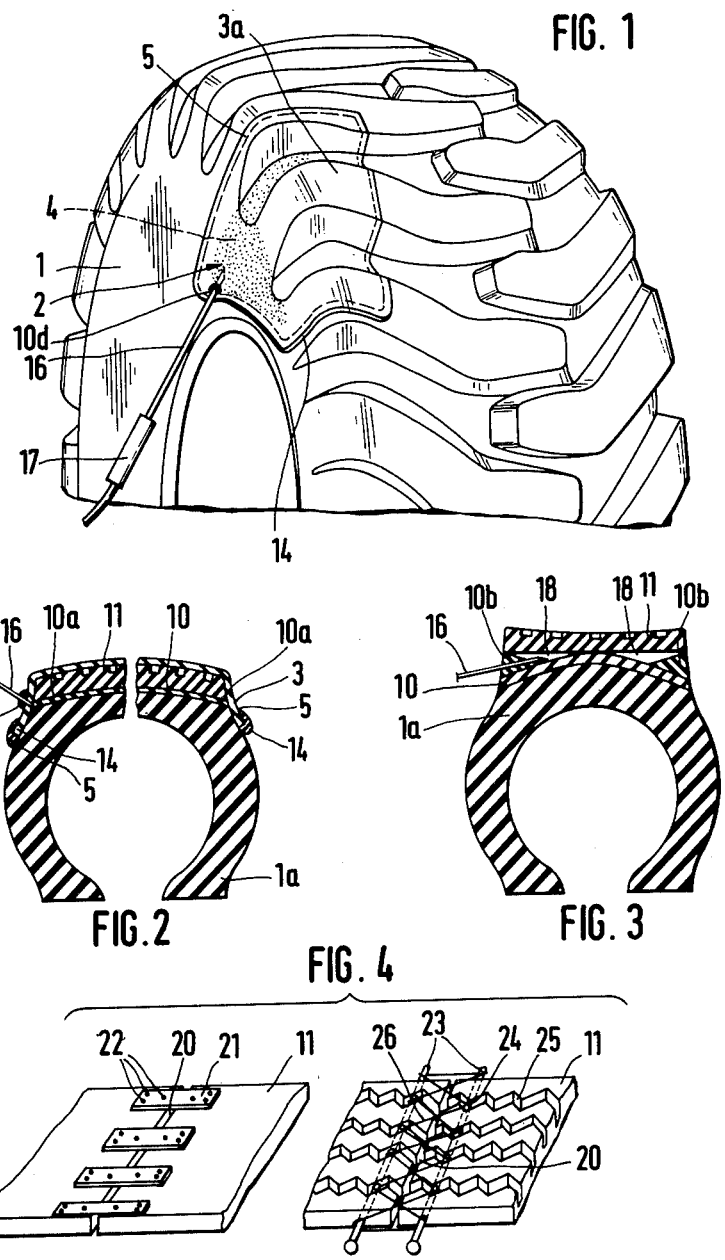

METHOD FOR RETREADING AND REPAIRING VEHICLE TIRES

The invention relates to a method of retreading and repairing vehicle tyres.

As regards the retreading methods which are concerned here, a layer of vulcanisable rubber, called bonding rubber, is laid on a prepared carcass and thereafter a vulcanised tread strip in the form of a ring, a strip section or in the form of separate segments adjoining one another is placed thereon, with subsequent sealing of this layer formation. At least the lateral outlet points of the bonding rubber are sealed off, for example, by means of a flexible rubber covering of the tyre, at least in the region of the lateral outlet points of the bonding rubber. Any occlusions of air or gas are now removed from the bonding rubber region by using reduced pressure and/or excess pressure on the bonding rubber region, and in the event of a casing or sleeve being used, by suitable application of reduced pressure and/or excess pressure to these latter. Then follows a treatment of the tyre as thus prepared in the autoclave, using pressure and heat, for the purpose of vulcanising the bonding rubber layer, which firmly unites the tread strip with the carcass in the vulcanised state.

With repairs to tyres having damaged positions, the procedure is similar, in that the vulcanisable rubber and other repair material are applied in the region of the damaged position on the carcass, with subsequent sealing of the point of repair, for example, by covering the latter by means of a piece of a flexible rubber sleeve or cover which can be sealed off at its edge completely around the carcass. In this case also, reduced pressure and/or excess pressure is applied to the bonding rubber region for the purpose of removing gas occlusions, whereafter the vulcanisation of the bonding rubber takes place as previously explained.

In both cases, reduced pressure or vacuum is usually exerted through a hose connection on the sleeve, cover or sheathing on the region beneath the latter. Vacuum connections with a corresponding screw coupling on the sheathing, however, generally project outwardly and consequently are capable of being easily damaged. In addition, the hose coupling interferes with the work carried out on the tyre, for example, the insertion of the completely prepared tyre in the autoclave. The vacuum effect is not always uniform. The region of the bonding rubber which is in the vicinity of the hose connection is frequently exposed to a higher vacuum than other regions, to which the access can be obstructed, for example, by the bonding rubber in this case acting as an undesired seal and blocking the discharge of air.

Consequently, the object is to simplify the use of vacuum in connection with retreading and repair operations.

In order to achieve this object, it is proposed according to the invention that the air and gas occlusions are removed by suction by means of a hollow needle which is pushed through a part which covers the bonding rubber, such as the cover or the seal itself, and of which the opening used for the puncturing is sealed off after the extraction by suction.

This solution permits of avoiding the use of any fixed vacuum connections when employing a cover or sheathing. Instead, a sharpened hollow needle or one which is oblique or comes to a point at the forward end is used for penetrating into the cover, said needle being connected to a vacuum line.

If, when making repairs, the repair point is prepared as indicated above, covered with a piece of sheathing and the latter is itself sealed off on the carcass, it now only requires the use of the hollow needle, with which the cover is punctured at a position which depends on the size of the place being repaired, whereafter a valve in the vacuum line is opened, so that it becomes possible for all air and gas occlusions to be removed by suction from the region beneath the cover and also from the surroundings of the raw rubber by means of the hollow needle. After the suction has been completed, the perforation is sealed, preferably by sticking bonding rubber on the said opening. This is the simplest method of sealing, and the bonding rubber is advantageously stuck on to the puncturing point before the insertion of the needle.

The suction method according to the invention can likewise also be used to advantage in connection with the retreading itself, if the made-up tyre is completely or partially enclosed with a complete or partial cover. The suction procedure by means of a hollow needle here permits occlusions to be removed by suction from the layer structure of the tyre at different positions on the tyre periphery. When using bonding rubber for sticking and sealing the perforation, the latter is automatically and permanently closed when vulcanising the tyre, by vulcanisation of the bonding rubber used for sealing purposes.

Furthermore, the method according to the invention offers particular advantages when it is used for retreading methods operated without covers. The tread elements or segments or the tread strip, more particularly in the form of a ring, are laid on the prepared carcass and sealed off all around their edges on the carcass, preferably by means of suitable strips of bonding rubber. Thereafter, the tread elements or the tread strip are applied tightly by suction to the carcass and are in this way retained on the carcass, with simultaneous discharge of any air or gas occlusions between the tread strip and the carcass, by the strip itself being perforated by means of the hollow needle or even by the hollow needle advantageously being introduced, advantageously through the bonding rubber seal extending completely around the carcass, into the interstices and suction is thus applied to these latter. For this purpose, a suitable vacuum is exerted on the hollow needle and from the latter to the interstices. The hollow needle is thereafter once again extracted from the tread strip, from the layer of bonding rubber or from the segments, and the point of perforation is sealed off with bonding rubber. In this manner, firmly adhering segments, individual tread elements or even tread strips adhering firmly to the carcass are obtained, so that the tyre completely made up in this way can be heated without any covering, i.e. without any flexible rubber sheathing. This is because the tread strip and particularly the edges thereof remain tightly held by suction on the carcass and consequently cannot become detached, if the adhesive force of the bonding rubber is decreased while the build up tyre is being heated in the autoclave and the elastically deformed edges of the tread strip tend to lift or become detached from the carcass.

In the case of a cover-free sealing of the tread strip relatively to the carcass, bonding rubber supports which are wedgeshaped in cross-section and which consist of highly elastic and highly heat-conductive bonding rubber material are preferably arranged between the edges of the tread and the carcass. In this way, the tread strips, more particularly of annular form, and also the segments, are given an initial stress at the edge or rim if the air which is occluded between the carcass covered with bonding rubber and with the wedge-shaped bonding rubber supports and the tread strip, by which is always understood in the following also separate tread elements, segments and tread material in many different forms, is drawn off by suction through the hollow needle, until the entire bonding surface of the tread has been firmly applied to the layer of bonding rubber. Furthermore, the use of highly elastic bonding rubber supports avoids the bonding becoming detached at the lateral seams from the carcass or from the tread in the event of transverse stresses, which detachment can readily occur when there is only a relatively thin layer of bonding rubber at the seams, and more especially with butted profile edges. In the event of transverse stressing, more especially with tyres of multi-axle semi-trailers, the bonding rubber immediately reaches an elongation of 300% at the seams and can be stripped off directly at the edge from the carcass or from the tread in the event of further stressing. This is now avoided according to the invention by the wedge-shaped bonding rubber supports. There is now a considerably longer path of elongation, so that with transverse stresses, there is now a constriction of the bonding rubber rim in the manner of a channel at the seam. In the event of further stressing beyond this elongation, the forces are no longer acting on the upper and lower edges of the bonding rubber rim which is channel-shaped in cross-section, but instead at a distance from said edges. In this condition, the path of forces is from the centre of the channel, namely, from the point of maximum constriction, is obliquely upwards or downwards in the direction of the mean plane of the carcass or tread. At this position, the layer of bonding rubber is still comparatively thick, so that here there is scarcely any danger of tearing, as is the case directly at the rim or edge. If possible, the bonding rubber layer should be made thicker near its outer edge, but without forming a projecting bead. This surface, formed from the side of the tread, the outlet point for the bonding rubber and the side of the carcass, should rather be smooth or have a continuous slight curvature.

However, the wedge-shaped bonding rubber supports can also be designed and applied in such a way that the tread strip is initially arched by the bonding rubber supports at the edges, as a result of which there is once again a prestressing of the tread, so that with the flow of the bonding rubber and thus also of the bonding rubber supports, the edges of the tread strip drop again and advantageously change into a slightly concave curvature.

For strengthening the bonding rubber wedge, it is also possible for the carcass shoulders and/or the tread edges to be bevelled for the purpose of forming an opening wedge-shaped in cross-section for receiving the wedge-shaped bonding rubber supports.

The invention is hereinafter more fully explained by reference to constructional examples and to the drawings, wherein:

FIG. 1 is a perspective view of the upper half of a tyre of an earth-moving machine with a position for repair, which is covered by means of a flexible covering as a sheathing;

FIG. 2 is a cross-sectional view of a tyre having a sheath or cover stuck and sealed off on the tyre walls;

FIG. 3 is a cross-sectional view of a tyre with which harmful air and gas occlusions are removed by suction without using a cover;

FIG. 4 shows perspective views of two constructional forms of joint holders, i.e. possibilities of connections at the joint at which the two ends of the tread butt one against the other.

On the tyre 1 of an earth-moving vehicle as shown in FIG. 1 is to be seen a repair position indicated generally at 2, which has been prepared, roughened, filled with unvulcanised bonding rubber 4 and smoothed, and thereafter has been closed off with a flexible cover 3a, for example of rubber material, provided as a sheath. The encircling edge 5 of the cover 3a is stuck by means of an adhesive material, in the present case a bonding rubber material, along its entire length on the tyre and sealed off, that is to say, both along its path on the tyre wall and also over the tread lands and depressions. If a vulcanisation of the bonding rubber only used for sealing purposes is not desired, raw rubber without sulphur, accelerator, etc., is for example used. In this way, the repair point is enclosed all round by the cover 3a and sealed off, so that now it is possible for the cover 3a to be punctured by means of a hollow needle 16 which is provided with a handle 17 and which is connected to a controllable vacuum pipe, and the repair point 2 can be subjected to a pressure treatment by means of vacuum. For this purpose, the tip of the hollow needle 16 only penetrates to such an extent into the cover 3a that the opening of the hollow needle 16 just reaches the space which is beneath the cover 3a. Now all air and gas occlusions in the interstice are removed. As soon as the cover 3a is bearing tightly everywhere on the repair point 2, because the suction effect has ended, the hollow needle 16 is retracted and the puncturing point is sealed off and stuck with bonding rubber. Before introducing the hollow needle 16, bonding rubber in the form of a rubber piece 10d is applied and pressed tightly on the puncturing position before the said rubber piece 10d and the cover 3a are then simultaneously punctured by the hollow needle 16. In this way, an immediate sealing of the puncturing point after withdrawal of the needle is very greatly simplified and made easier.

The vulcanisation of the tyre as thus prepared can now take place in the autoclave. However, also a local heating is possible, as for example by heat radiation directed on to the repair position or by the fitting of heating elements into the cover 3a.

FIG. 2 illustrates the use of a cover 3, the edges 5 of which are stuck by means of adhesive material 14 on to the carcass 1a and sealed off thereon. The figure shows a built-up tyre, on to the prepared carcass 1a of which has been applied a tread 11 with interposition of a sheet 10 of bonding rubber. As can be seen, the sealing of the cover edges 5 is effected underneath the seams 10a of the bonding rubber sheet 10 on the walls of the carcass 1a, this being effected on the left-hand part of FIG. 2 by placing adhesive material 14, for example bonding rubber, beneath the edge or rim 5, while in the case of the right-hand part of FIG. 2, this is effected by the interstice between the edge 5 of the cover 3 and the carcass 1a being bridged over by a strip 14 of adhesive material, for example, bonding rubber. The method is carried out in other respects as explained in connection with FIG. 1, i.e. the harmful air and gas occlusions are withdrawn by suction from the space beneath the cover 3 and also from the interstices between the bonding rubber plate or sheet 10 and the carcass 1a, and also the tread 11, by means of the hollow needle 16. This suction process can if necessary take place at several positions on the tyre circumference. Always after the hollow needle 16 has been retracted, the point of puncture is once again sealed with bonding rubber material, which advantageously also in this constructional example is already applied beforehand in the form of a piece of bonding rubber 10d to the cover 3 and is punctured by the hollow needle 16, so that ultimately there is obtained a layer formation of the tyre which is free from air occlusions and which is enclosed by the cover 3.

FIG. 3 merely shows an embodiment for another very wide range of application of the suction process by means of the hollow needle 16. With the constructional example as chosen, not only is there a bonding rubber sheet 10 between the carcass 1a and the tread 11, which here is preferably a tread strip ring, but in addition bonding rubber supports which are wedge-shaped in cross-section are arranged at the sides, as a result of which cavities 18 can be formed after the tread has been fitted. If now the hollow needle 16 is introduced into the layer formation, preferably through the bonding rubber layer 10 or one of the supports 10b, a force is exerted on the underside of the tread 11 when the air occlusions are extracted by suction and this force presses the tread 11 against the bonding rubber. As a result, the tread 11 changes its position which is shown in FIG. 3, in which the edges of the tread are prestressed by arching of the said edges and presses against the bonding rubber layer 10 or against the supports 10b. The result is that the tread 11 is caused to bear everywhere against the bonding rubber disposed thereberneath. The tread 11 is drawn downwardly at its sides, i.e. towards the mean axis of the carcass, and hence the tread 11 is given a somewhat curved form in cross-section. The outer edges of the supports 10b are pressed in slightly, but also the supports 10b are under the effect of vacuum, so that they only deflect outwardly to a small degree. The puncturing point or points of the hollow needle 16 are again sealed off, so that firstly the tread 11 is pressed under the action of the vacuum tightly against the bonding rubber and hence indirectly against the carcass 1a, and secondly a tyre layer formation is obtained which is free from air occlusions and is sealed off all round.

If the earth-moving vehicle tyre is provided with segments or individual tread elements, these are separately sealed off all round the carcass by means of bonding rubber and the space which forms in this way beneath the elements is subjected to the suction effect with the hollow needle 16.

FIG. 4 represents two possibilities as to how the butt joint 20 of the tread 11 can be united, if a section of a tread strip is applied to the carcass 1a instead of a complete tread ring. The connections as represented can of course also be already produced before the tread strip 11 is applied to the carcass 1a. The joint holder according to the left-hand part of FIG. 4 consists of a plurality of plates 21, for example, of sheet metal, distributed over the length of the joint 20, these plates being fixed by means of nails 22 or suitable staples at both ends of the tread strip 11 in the manner indicated. According to the right-hand part of FIG. 4, two spit-like members 23 are used, of which one is pushed at each end of the tread 11 transversely through the latter, in such a way that always the traversing parts 24 of the said members are visible and can be reached in the profile depressions 25 of the tread 11. A band 26, a piece of wire or another similar connecting means can now be bound, as shown, around the two spit members 23 and their parts 24 in the profile depressions 25, so that the two ends of the tread cannot become detached from one another.

It is also to be pointed out that a bonding rubber having high thermal conductivity is chosen, more particularly for the bonding rubber supports 10b, so that above all there is no accumulation of heat at the edges.

The tyres built up in the manner as previously described can be freely heated without any cover or other accessories in the autoclave.

I claim:

1. A method for repairing a vehicle tyre comprising the steps of:
    filling a repair region of the tyre with vulcanisable binding rubber material,
    applying a flexible cover to the rubber filled region,
    attaching the flexible cover to the tyre with an adhesive that can withstand the vulcanisation temperature of the rubber filling around the border of the flexible cover to provide a seal between the flexible cover and the tyre,
    piercing the flexible cover with a hollow suction needle at at least one point over the repair region where air or other gas or vapour has accumulated within the repair region,
    evacuating the air or other gas or vapour from the repair region at each of said points by applying a suction through the needle,
    removing the needle from the flexible covering at each of said points after the air or other gas or vapour has been evacuated,
    sealing off the puncture opening in the flexible cover made by the needle at each of said points,
    heating the repair region to vulcanise and bond the rubber filling to the tyre.

2. A method for retreading a tyre comprising the steps of:
    applying an annular rubber tread portion to a retread region of the tyre with a vulcanisable binding rubber layer between the tyre carcass and the rubber tread portion,
    applying annular vulcanisable rubber inserts continuously around the annular tread portion at the sides of the binding rubber layer to bend up the tread edges and to provide a sealed area between the carcass, the binding rubber layer and the applied tread portion,
    evacuating the sealed area by inserting a suction needle through the rubber inserts or the binding rubber layer at at least one point over the retread region so as to remove air or other gas or vapour from the retread region,
    removing the needle and sealing off the puncture opening, and
    heating the retread region to vulcanise the binding rubber layer and rubber inserts to bond the tread portion to the carcass.

3. A method for retreading a tyre comprising the steps of:
    applying an annular rubber tread portion to a retread region of the tyre carcass with a vulcanisable binding rubber layer between the rubber tread portion and the tyre carcass,
    applying annular vulcanisable rubber inserts of wedge-shaped cross-section continuously around the annular tread portion at the sides of the binding rubber layer to bend up the tread edges and to create a downward biasing tendency in the edges of the applied tread portion and to provide a sealed area between the carcass, the binding rubber layer and the applied tread portion, evacuating the sealed area by inserting a suction needle through the rubber inserts or binding layer at at least one point over the retread region, removing the needle and sealing off the puncture opening, and heating the retread region to vulcanise the binding rubber layer and rubber inserts and bond the tread portion to the carcass.

4. Method as claimed in claim 1, wherein the puncture opening is sealed off by means of vulcanisable binding rubber.

5. Method as claimed in claim 1, wherein the puncture opening is sealed off by pressing a piece of vulcanisable binding rubber onto the proposed point of puncture before the said piece of rubber and the said flexible cover are penetrated by the suction needle.

6. Method as claimed in claim 2, wherein the puncture opening is sealed off by means of vulcanisable binding rubber.

7. Method as claimed in claim 2, wherein the puncture opening is sealed off by pressing a piece of vulcanisable binding rubber onto the proposed point of puncture before the said piece of rubber and the said binding rubber layer or inserts are penetrated by the suction needle.

8. Method as claimed in claim 3, wherein the applied tread or tread portion is arched outwardly from the carcass to follow the contour of the carcass by the said rubber inserts so as to cause a prestressing of the side edges of the tread or tread portion on the carcass.

9. Method as claimed in claim 3, wherein the carcass shoulders and/or side edges of the tread or tread portion are bevelled in order to form an opening wedge-shaped in cross-section for receiving the said rubber inserts.

10. Method as claimed in claim 3, wherein there is used for the said rubber inserts a vulcanisable binding rubber having a sufficiently high thermal conductivity to avoid or minimise heat accumulation in the retread region.

* * * * *